Feb. 10, 1953   G. F. McDOUGALL   2,627,627
DEFEATHERING DEVICE
Filed April 3, 1951   2 SHEETS—SHEET 1
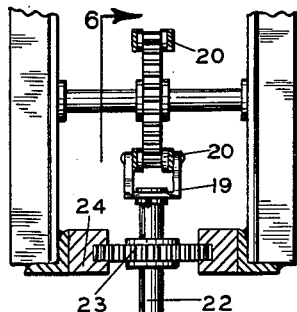
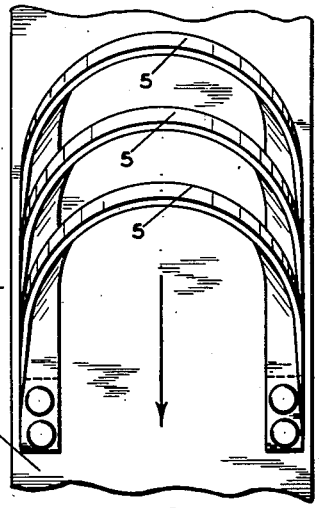
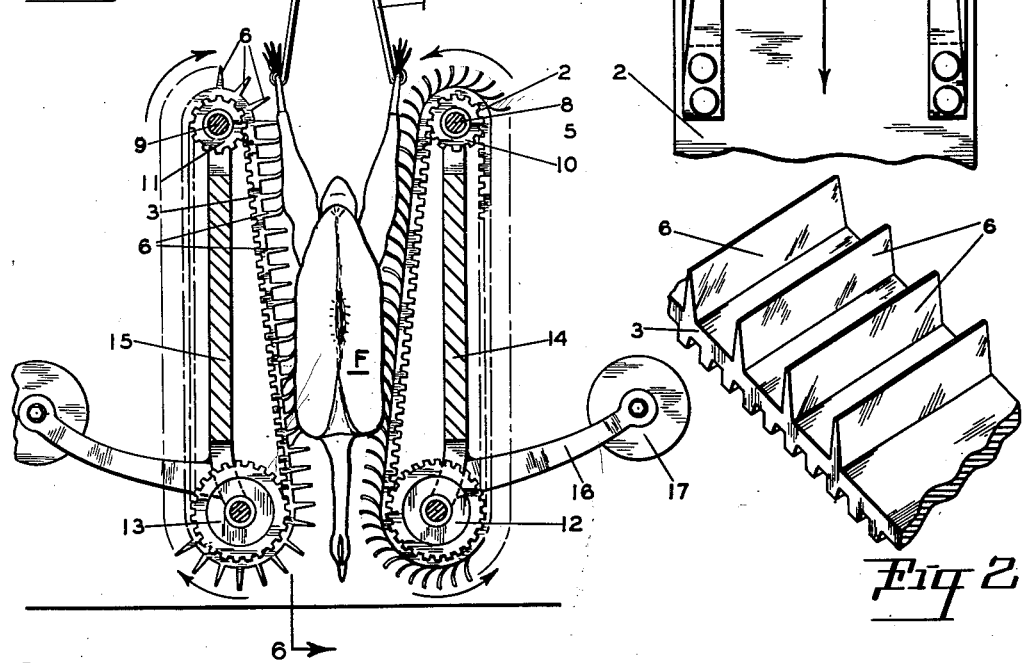
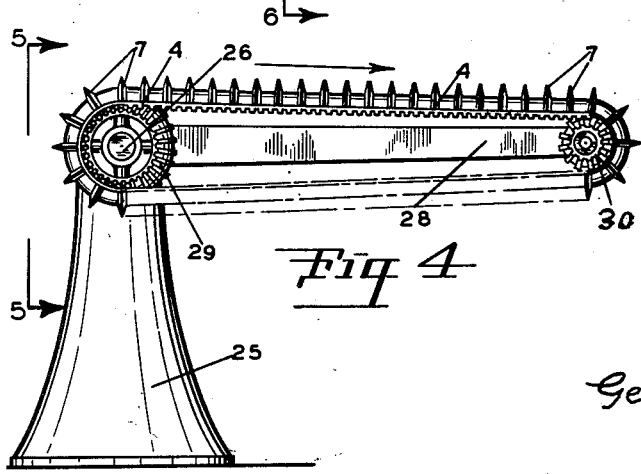
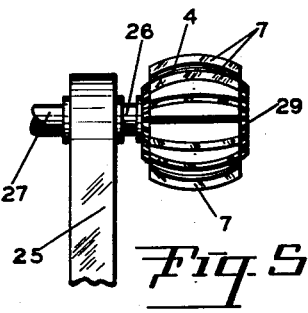
INVENTOR.
George F. McDougall Feb. 10, 1953    G. F. McDOUGALL    2,627,627
DEFEATHERING DEVICE
Filed April 3, 1951    2 SHEETS—SHEET 2
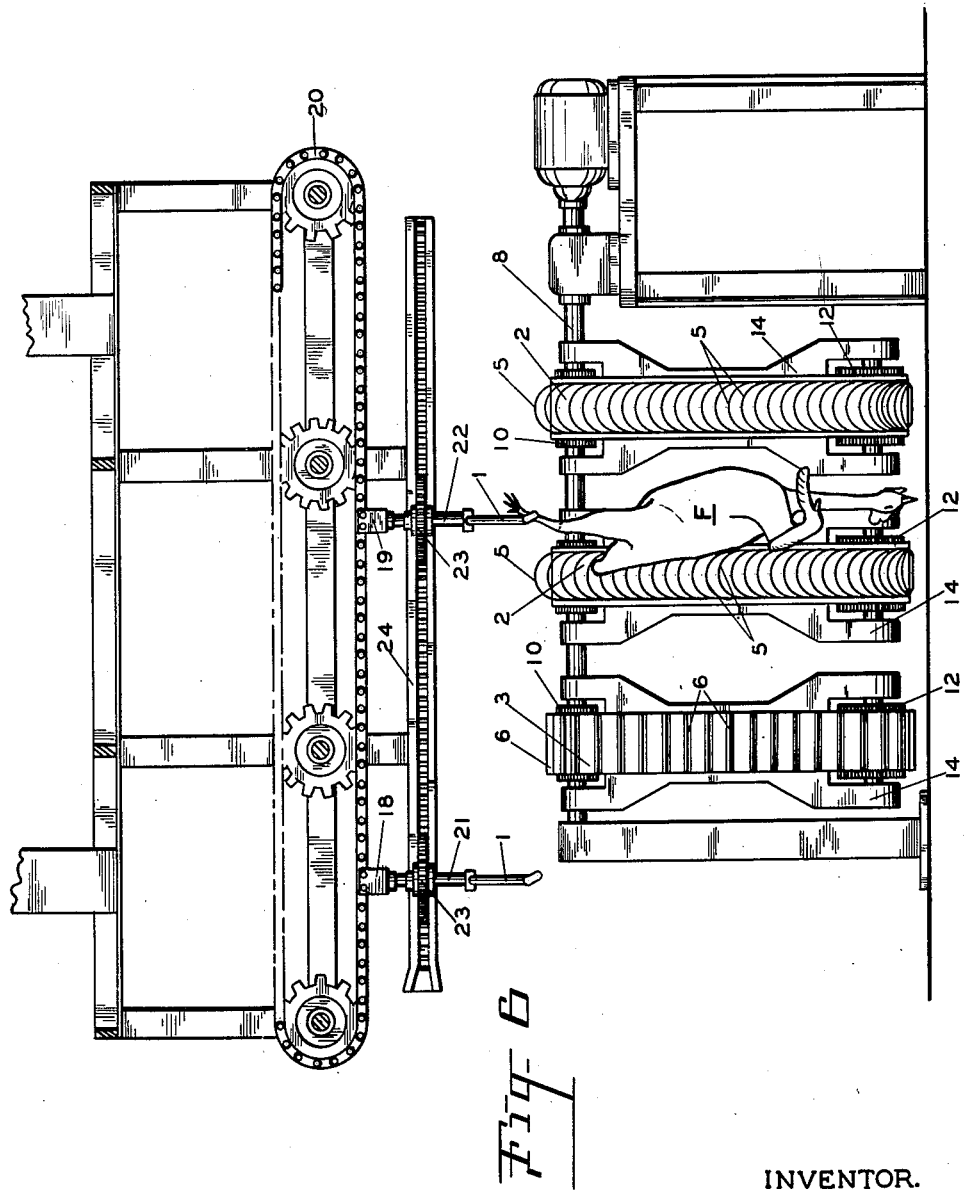
INVENTOR.
George F. McDougall Patented Feb. 10, 1953

2,627,627

UNITED STATES PATENT OFFICE 2,627,627

DEFEATHERING DEVICE

George F. McDougall, Portland, Oreg.

Application April 3, 1951, Serial No. 219,057

7 Claims. (Cl. 17—11.1)

This invention is of a device for removing feathers from the carcasses of fowls in preparing the same for the market as dressed poultry, or for intervening storage as expediency may determine.

The objects of the invention are to improve the machines and devices now available in the art and especially to improve the speed and at the same time the clean removal of the feathers.

Other objects will be apparent to those familiar with the requirements of such devices and still others are pointed out in the claims, which conclude this specification.

Drawings accompany and form a part of this specification, showing three specific forms of the feather removing means per se, wherein resides the novelty contained in this disclosure, together with several types of mechanical devices, schematically showing how the feather removing device of this invention may be moved by mechanical power to discharge its function, but it is to be understood that no novelty is ascribed to the mechanical devices as such, which are only a very few, comparatively, of the whole number of mechanisms that are available to advantageously move the feather removing devices over the carcasses of freshly "scalded" poultry, by driving my novel feather removing rubbery belts.

Drawings accompany and form a part of this disclosure, in which—

Fig. 1 is a plan view of a short section of rubbery belt, with three feather pulling loops of suitable material, preferably the same, securely fastened to its upper working face, which will preferably be formed with rack teeth on its pulley engaging face, as shown in Fig. 2;

Fig. 2 is a perspective view of a short section of rubber belt that varies from the belt of Fig. 1 only in being provided with upstanding tapered ribs across the face of the belt;

Fig. 3 is a schematic showing of a mounting for the belts of Figs. 1 and 2, that will be hereinafter explained;

Fig. 4 is of a stand supporting a horizontal arm which comprises a pair of spaced pulleys with driving means and an endless belt, made with a convex outer surface, being mounted for revolution as will be described;

Fig. 5 is an end view of a part of the structure of Fig. 4, taken from the plane 5—5, Fig. 4; and Fig. 6 is a schematic extended side view of the structure shown in Fig. 3 from the plane 6—6, Fig. 3.

Explaining the several structures shown in the figures: As is well known, feathers from a fowl are best removed when the defeathering is done within a short time after the carcass of the fowl is scalded, though the word scalded is rather overdrawn since the temperature of the scalding bath will be below 140 degrees Fahr., most easily removed by pulling them in a direction substantially opposite from that in which the feathers smoothly lay on a live bird. To that end, the fowl's carcass may be suspended by suitable means such as the double hook 1 in Figs. 3 and 6 and held firmly by the legs or otherwise to permit the revolving endless belts, such as 2, 3 or 4 with their feather engaging parts, 5, 6 or 7 in substantial contact with the surface to be defeathered. The effectiveness of the feather removal will be a function of the speed of the belts, which is easily learned by experience.

In Fig. 6, three belts are shown, two being of the type shown in Fig. 1 and the other one being of the type shown in Fig. 3. The belts are made endless and mounted as shown on the shafts 8 and 9 which carry respectively the driving gears 10 and 11 and the idle gears 12 and 13.

The driving and idle gears in each case are spaced apart by struts such as 14 and 15. It is preferred also that the struts be made to swing freely on the shafts such as 8 and 9 and that lever pendulum arms and weights such as 16 and 17 be provided to regulate the force of application of each belt with its feather removing, upstanding cross ribs, heretofore called feather engaging parts, identified by numerals 5, 6 and 7 as the pendulums as a whole, including the belt carriers, tend to swing inwardly towards both sides of a fowl carcass such as that indicated by the letter F.

Provision is made for suspending the hooks 1 by swivels 18 and 19 from the chain belt 20. The loose part of the swivels 18 and 19 are indicated by the shafts 21 and 22, each of which carries a gear 23 which engages the rack 24. Only a small part of the chain track and rack are shown, since it is not regarded as novel and the arts need no instructions about how to make them in loop form for continuous operation if this type of mounting for my rubber belt feather removing system is selected. There are many other ways in which the belts can be made to serve their peculiar task, though it is thought that it will be found expedient to suspend the fowl being defeathered so that it may pass between belts and revolve as its passes to remove the larger bulk of feathers in large poultry cleaning plants, while the small operator will probably find all that he needs in the structure disclosed in Figs. 4 and 5.

In these figures, 25 is a base member, secured on a suitable foundation or holding means on the upper end of which is revolubly mounted a driving shaft 26, suitably connected to a power supplying means on the part of the shaft shown broken off at 27, which shaft drives the driven gear 29. A rigid generally horizontal arm 28 is made integral with the base 25 and is fitted with a suitable bearing for the idle pulley, or gear 30.

The defeathering machine schematically illustrated in Figs. 4 and 5 may be regarded as complete in itself when furnished with an electric motor drive and effective for use on poultry farms and even in a back room of a city meat shop. Even in the largest plants several such machines in a room will be useful to finish clean a fowl that has passed through a production device with its belts with some material still to be removed.

The rubbery gear teeth on the inside of the belts, operating over suitable pulleys with mating gear teeth, will permit relatively positive drive with a considerable amount of slack in that reach of the carried belt that contacts the fowl being cleaned, with the result that better cleaning may be expected. Loads on the belts are relatively light and the customary friction cloth inserts in the belts have been omitted, but of course may be used if desired.

Where the type 5 upstanding feather removing rib is used, a considerably faster defeathering may be expected, though there is a possibility that a loop may hang up on a wing or the tail part of a fowl, in which case the rubbery teeth and body of the belt can yield to prevent spoiling the appearance of a fowl.

I have used the term "rubbery" to indicate material having the characteristics of rubber, whether vegetable or synthetic as for the purposes of this invention a wide range of selection of material is desirable.

Having fully described the action of my novel belt type defeathering device, what I claim as new and desire to secure by Letters Patent, is:

1. A machine for removing feathers from a fowl in preparation for marketing comprising an endless rubbery belt member, upstanding spaced ribs of like material across the outside surface of said belt made unitary therewith, pulleys upon which said belt is revolubly mounted in spaced relationship to provide reaches of the belt between the pulleys and means for driving the belt by revolving the pulleys.

2. A machine for defeathering a fowl in preparation for market, comprising a plurality of pulleys, power driving means operatively connected to at least one of said pulleys, an endless rubbery belt mounted to run on said pulleys, upstanding cross ribs of like material made integral with the outer surface of said belt, gear-like teeth on the inside of said belt and matching teeth on said driving pulley.

3. A feather removing belt for a fowl picking machine comprising an endless rubbery belt, upstanding spaced ribs of flexible material across the outside surface of said belt, said ribs made unitary with the outer surface of the belt, said ribs spaced relatively closely together for engagement with feathers to pull them free from a fowl.

4. A feather removing belt for a fowl picking machine comprising an endless rubbery belt, upstanding flexible ribs of like material across the outer surface of said belt, said ribs spaced apart to provide a feather engaging surface on the belt, said ribs of substantially equal height and form and pulley mountings for said belt to remove feathers from poultry by rapid contact of the ribs with the feathered surfaces thereof.

5. A feather removing belt for a fowl picking machine comprising an endless rubbery belt adapted to run on spaced apart pulleys with tension sustained reaches between the pulleys, upstanding spaced ribs of rubbery material across the outer surface of said belt in spaced relationship, said ribs curved towards the belt at their ends to make the belt surface including the ribs convexly curved at the edges of the belt.

6. A fowl defeathering machine comprising a base, a belt carrying arm projecting outwardly from said base, pulleys mounted for revolution at opposite ends of said base, means for revolving at least one of said pulleys as a driving pulley, a rubbery belt mounted on said pulleys to provide a plurality of flexible reaches of said belt, a plurality of substantially uniformly spaced apart rubbery ribs across the outer face of said belt, said ribs made unit moulded with said outer belt surface and frictional contact means on the outer surface of said driving pulley and the inside surface of the belt.

7. A feather removing belt for a fowl picking machine comprising an endless rubbery belt adapted to run on spaced pulleys leaving reaches sustained by tension between the pulleys, upstanding ribs in substantially equally spaced longitudinal position across the outer surface of said belt for feather engaging and pulling purposes and the free edges of said ribs constituting the working surface of said belt.

GEORGE F. McDOUGALL.

REFERENCES CITED

The following references are of record in the file of this patent:

UNITED STATES PATENTS

| Number | Name | Date |
|---|---|---|
| 908,933 | Bainter et al. | Jan. 5, 1909 |
| 1,834,479 | Taylor | Dec. 1, 1931 |
| 2,311,365 | Campbell | Feb. 16, 1943 |
| 2,539,688 | Berg | Jan. 30, 1951 |
| 2,571,042 | Kemp | Oct. 9, 1951 |